US007100896B1

(12) United States Patent
Cox

(10) Patent No.: US 7,100,896 B1
(45) Date of Patent: Sep. 5, 2006

(54) SHIPPING CONTAINER HANDLING SYSTEM

(75) Inventor: Henry Cox, Conway, SC (US)

(73) Assignee: North American Partners, Conway, SC (US)

(*) Notice: Subject to any disclaimer, the term of this patent is extended or adjusted under 35 U.S.C. 154(b) by 0 days.

(21) Appl. No.: 10/888,017

(22) Filed: Jul. 12, 2004

(51) Int. Cl.
*B66F 7/14* (2006.01)
*B60P 3/00* (2006.01)

(52) U.S. Cl. ......................... 254/92; 414/498; 414/458

(58) Field of Classification Search ................ 414/458; 254/98, DIG. 9, DIG. 16, 93 A, 102, 7 C, 254/10 R, 92, 89 R
See application file for complete search history.

(56) References Cited

U.S. PATENT DOCUMENTS

| | | | | |
|---|---|---|---|---|
| 3,255,906 | A * | 6/1966 | Proler et al. | 414/458 |
| 3,327,996 | A * | 6/1967 | Morse | 254/2 R |
| 3,474,924 | A * | 10/1969 | Wheeler | 414/458 |
| 3,612,315 | A * | 10/1971 | Blackburn | 414/495 |
| 3,631,999 | A | 1/1972 | Walerowski | 414/458 |
| 3,749,363 | A * | 7/1973 | Hauser | 254/45 |
| 3,758,074 | A * | 9/1973 | Jeffries et al. | 254/45 |
| 3,773,199 | A * | 11/1973 | Arvidsson | 414/498 |
| 3,887,209 | A * | 6/1975 | Blanc | 280/43.21 |
| 4,053,072 | A * | 10/1977 | Ross et al. | 414/495 |
| 4,053,073 | A * | 10/1977 | Franchin | 414/495 |
| 4,190,135 | A * | 2/1980 | Wenzel et al. | 254/133 R |
| 4,231,709 | A * | 11/1980 | Corsetti | 414/458 |
| 4,313,708 | A * | 2/1982 | Tiliakos | 414/498 |
| 4,516,901 | A * | 5/1985 | Riedl | 414/458 |
| 4,743,059 | A * | 5/1988 | Legueu | 296/24.38 |
| 4,903,946 | A * | 2/1990 | Stark | 254/45 |
| 5,006,031 | A | 4/1991 | Fossing et al. | 414/458 |
| 5,417,540 | A * | 5/1995 | Cox | 414/495 |
| 5,800,114 | A * | 9/1998 | Secondi | 414/458 |
| 6,019,565 | A * | 2/2000 | Gesuale | 414/458 |
| 6,071,062 | A * | 6/2000 | Warhurst et al. | 414/498 |
| 6,155,770 | A * | 12/2000 | Warhurst | 414/498 |
| 6,315,079 | B1 * | 11/2001 | Berends et al. | 187/210 |
| 6,939,098 | B1 * | 9/2005 | Schults | 414/459 |
| 2002/0003996 | A1 * | 1/2002 | Lim et al. | 414/498 |
| 2002/0015637 | A1 * | 2/2002 | Franzen et al. | 414/458 |
| 2004/0013504 | A1 * | 1/2004 | Schults | 414/459 |

FOREIGN PATENT DOCUMENTS

GB 2044688 A * 10/1980

* cited by examiner

*Primary Examiner*—Dean J. Kramer
*Assistant Examiner*—Charles N. Greenhut
(74) *Attorney, Agent, or Firm*—Dowell & Dowell, P.C.

(57) ABSTRACT

A system for loading, off-loading and/or transferring conventional international shipping containers with respect to transport vehicles which system includes a plurality of powered jacks each of which includes upper and lower container attachment members which are selectively engageable with upper and lower corner lock castings of the containers. Each attachment member is carried by a guide sleeve slideably mounted relative to a vertical standard with an upper guide sleeve being drivingly engaged with a power driven member such that, with the attachment members engaged with the corner locks of the container, the simultaneous activation of four jacks allows the elevation and/or lowering of a shipping container relative to a vehicle.

10 Claims, 10 Drawing Sheets

SHIPPING CONTAINER HANDLING SYSTEM

BACKGROUND OF THE INVENTION

1. Field of the Invention

This invention is generally directed to shipping container handling systems and more specifically to a system which incorporates a plurality of electrically powered vertically adjustable jacks. The jacks are selectively engageable with corner castings of conventional shipping containers and are used to raise and lower the containers from a stationary surface or from a truck bed such that the containers are not tilted during loading, off-loading or transferring between vehicles, thereby preventing possible damage to the contents of the containers and without the need for expensive heavy-duty elevating and lifting equipment which is conventionally necessary for handling such containers.

2. Brief Description of the Related Art

To maximize the efficiency of the shipment of goods by various carriers including aircraft, ships, railways trucks and the like, and to allow goods to be transferred from one shipping vehicle to another, the shipping industry has developed standardized shipping criteria with respect to containers for handling goods during shipment. The development of internationally dimensioned shipping containers allows containers to be shipped between countries in such a manner that the containers may be loaded and off-loaded with respect to vehicles with greater efficiency and also allows for goods to be stored with maximum efficiency.

Typical international shipping containers are steel containers of predetermined volume or size which are designed such that one or both of the ends of the container can be opened or accessed to load or discharge goods. Each container also includes lock castings at each of the corners of the container for purposes of allowing containers to be locked in stacked position or to be engaged by hoisting or elevating equipment, such as hoists or cranes which are used to elevate containers from a dock area into the hold of a ship or from a dock to a bed of a truck.

One of the problems associated with the handling of international shipping containers is that heavy-duty lifting equipment must be available at delivery or transfer sites. The need for heavy-duty lifting equipment has limited the deployment efficiency of shipping containers often requiring goods be delivered to the closest available delivery point, where such heavy-duty equipment is available. In addition, should a vehicle such as a truck, break down during transport of a shipping container, it is a difficult problem because heavy-duty lifting equipment must be brought to the site of the breakdown in order to transfer containers from one vehicle to another.

In view of the foregoing, there is a need to develop a system which allows greater flexibility in the handling, loading, off-loading and transferring of international shipping and storage containers at substantially any desired location. Further, it would be preferred that such a system include handling devices which are portable such that they may be carried by the transport vehicle so as to be accessible for use in any location.

In view of the desire to be able to effectively handle large and heavy international shipping containers at substantially any location, it is also preferred that a system be provided which allows for power to be provided by the transport vehicle such that no additional source of power is required at the point at which the containers are to be handled.

A further concern with an effective handling system for shipping containers is to provide for a system which protects goods which are transported within the containers. Currently, some shipping containers are loaded or off-loaded by vehicles having tilt bed loading and off-loading systems. Such systems off-load by tilting the bed of the vehicle, allowing a container to slide from the vehicle to a support surface. By reversing the processes, a container can be elevated by sliding onto a tilted bed of the vehicle and thereafter lowering the bed. Unfortunately, goods are subject to damage when containers are loaded or off-loaded in a tilted or slanted manner and thus such loading and off-loading presents risks of damage to the goods from sliding, unless they are secured inside. Such securing would require measures that would require time, labor, and, materials to provide.

SUMMARY OF THE INVENTION

The present invention is directed to a shipping container handling system which includes a plurality of jacks which are designed to be electrically powered, such as from batteries of a transport vehicle, such as a truck. Each jack is designed to be manually manipulable such that the jack may be rolled to and placed on a vehicle for transport with a shipping container or may be secured to the container being shipped. In some embodiments, the jacks may be stored at various predetermined locations for use in handling shipping containers, not only to load or off-load the containers, but to allow for the transfer of the containers from one vehicle to another.

Each jack includes a vertical standard on which separate support guide sleeves are slideably mounted. An upper guide sleeve is rigidly connected to a traveling nut which is threadingly engaged with an elongated vertically extending power screw which is driven by way of a drive connection to the output of an electric motor mounted exteriorly of the standard. An upper attachment member is carried by the upper sleeve and includes a twist lock attachment member which may be operated by an elongated handle which permits the lock to be manipulated from a distance such that, when a container is elevated above the ground, an operator at ground level can easily engage or disengage the lock. A second attachment member including a twist lock is carried by a lower guide sleeve. The lower guide sleeve is connected for simultaneous movement with the upper guide sleeve by way of at least one diagonal brace which is pivotally connected at one end to a housing mounted to the lower guide sleeve and at it's opposite end to the upper guide sleeve.

Due the diagonal and pivotal connection between the upper and lower guide sleeves, the present invention may be utilized to manipulate containers relative to a support surface wherein the support surface may not be level, such as on a sloping driveway, parking lot or the like, while maintaining the shipping container at a relatively horizontal orientation as it is raised and lowered.

In a preferred embodiment of the invention, the upper guide sleeve includes concentric inner and outer tube members which are sliding disposed on opposite sides of the central standard of the jack. By providing such a concentric structure for the upper guide sleeve, a greater resistance to any bending force between the upper guide sleeve and the standard is provided.

Although various controls may be provided for the electrical motor associated with each of the jacks, in the preferred embodiment, a remote type RF controller is provided which may be used to simultaneously control four jacks at one time, thus allowing the simultaneous raising or lowering of the drive screws associated with each jack from a single position.

Utilizing four jacks, the attachment members associated with each jack are connected to the shipping container such that the upper and lower attachment members are secured to spaced corner castings of the container. The standard is of sufficient height such that if a container is loaded on the bed of a truck or trailer, the upper and lower guide sleeves may be elevated with the base of the standard engaging the ground until such time as the attachment members are aligned with the upper and lower corner castings. After the twist locks of the attachment members are secured at the corner castings, the electric motors of the four jacks may be activated to selectively raise the container relative to the truck bed or trailer thereby allowing the trailer to be moved from beneath the shipping container, such that within another trailer may be maneuvered beneath the container to allow transfer of the container, or the container may be selectively lowered to the ground or other support surface.

When a container is positioned on a support surface, such as the ground, the jacks are operated to move their attachment members to their lowermost position relative to the standards of the jacks. Thereafter, the attachment members are locked in position in the corner castings of the container. The container may then be selectively elevated to a desired degree to permit loading on a vehicle, such as a trailer or truck bed.

It is the primary object of the present invention to provide a portable system for loading, off-loading and transferring international shipping containers without requiring conventional heavy-duty equipment, thus allowing containers to be load, off-loaded or transferred at substantially any location.

It is the further object of the present invention to provide a system for handling international shipping containers which permits such containers to be loaded, off-loaded or transferred between vehicles in such a manner the containers are maintained in a horizontal orientation thus limiting possible damage to goods stored within the containers.

It is yet a further object of the present invention to provide a system for handling shipping containers wherein portable jacks are used which are selectively electrically powered utilizing a source of electricity which may include the batteries of a transport vehicle, such as a truck, thus allowing loading, unloading and transferring at substantially any location where power is not otherwise available.

It is also an object of the present invention to provide a container handling system which substantially decreases the cost associated with the loading, unloading and/or transferring of international type shipping containers by not only reducing equipment costs associated therewith but also by reducing the amount of manual labor costs, as loading and unloading can be undertaken by a single operator.

A BRIEF DESCRIPTION OF THE DRAWINGS

A better understanding of the invention will be had with reference to the accompanying drawing wherein.

Figures 6A, 6B, 6C:
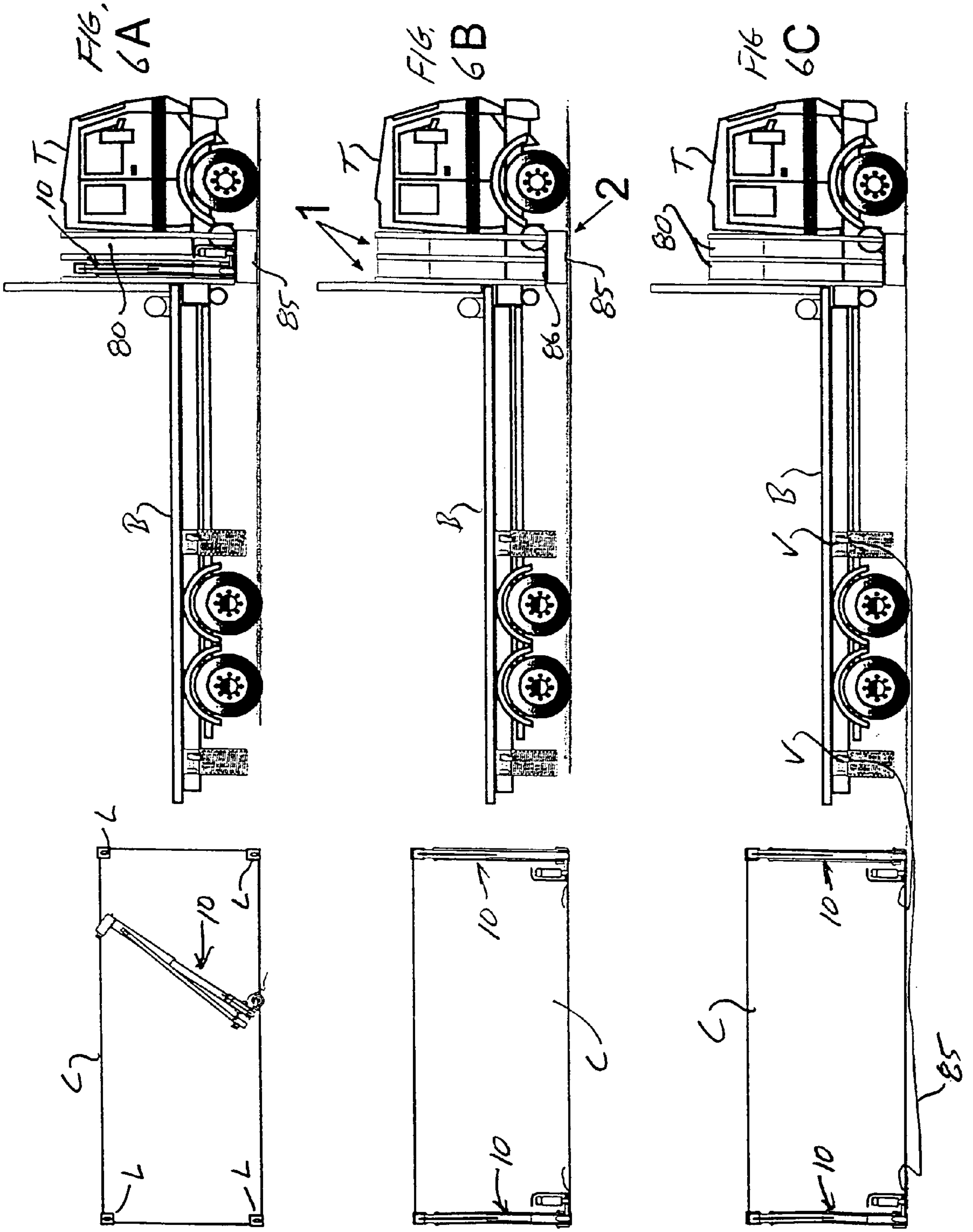
FIG. 6A is a an illustrational view showing a container having a first jack mounted thereto where the container is on the ground preparing to be loaded onto the bed of the trailer.
FIG. 6B shows all jacks mounted to the container awaiting loading on the trailer of FIG. 6A.
FIG. 6C is an illustrational view showing the motors of each of the jacks being connected to a source of electrical supply of the truck of FIG. 6A.
Figure 6D:
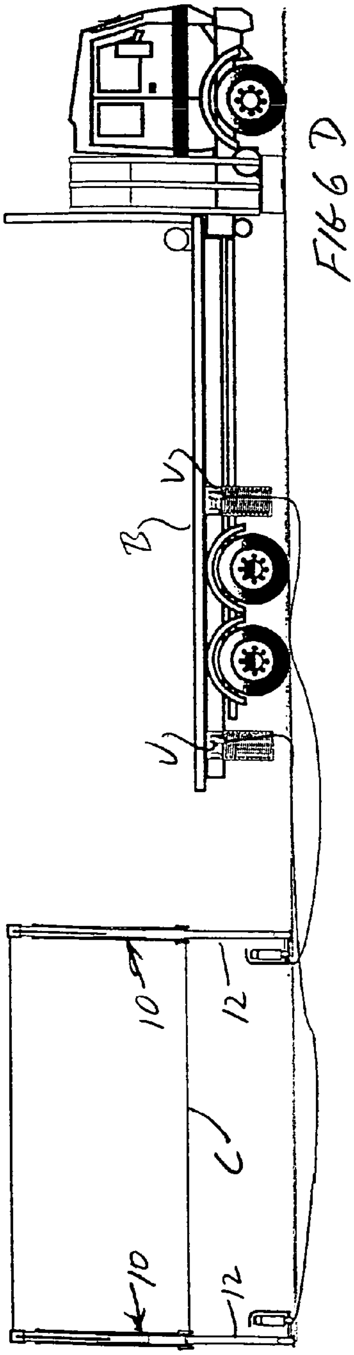
FIG. 6D is an illustrational view showing the jacks of the present invention elevated to raise the container relative to the trailer of FIG. 6A.
Figure 6E:
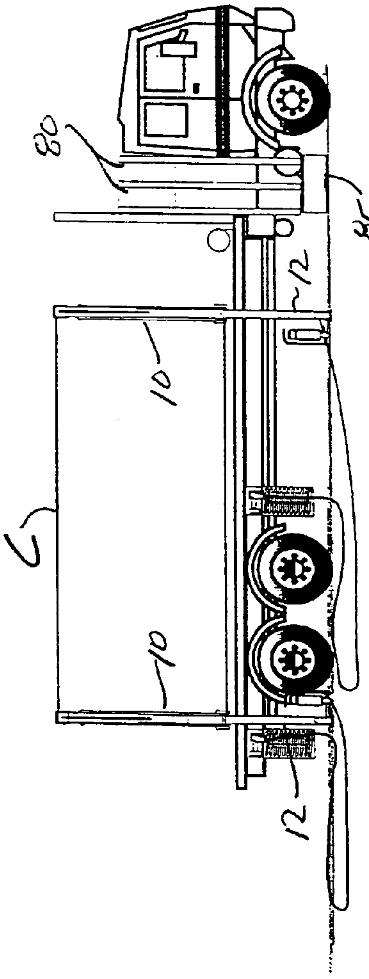
FIG. 6E is an illustrational view showing the trailer bed being position beneath the container with the container being lowered by the jacks.
Figure 6F:
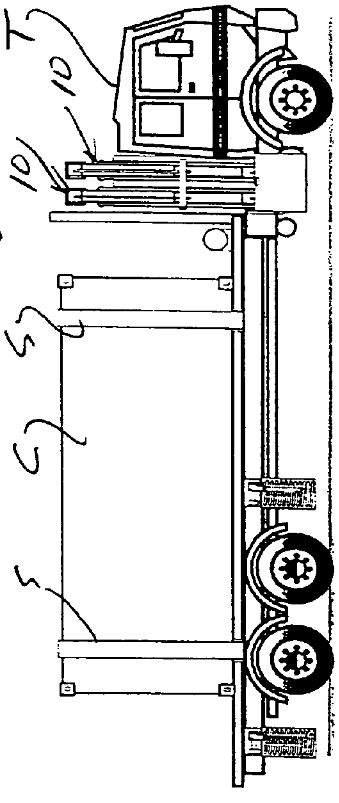
Figure 7:
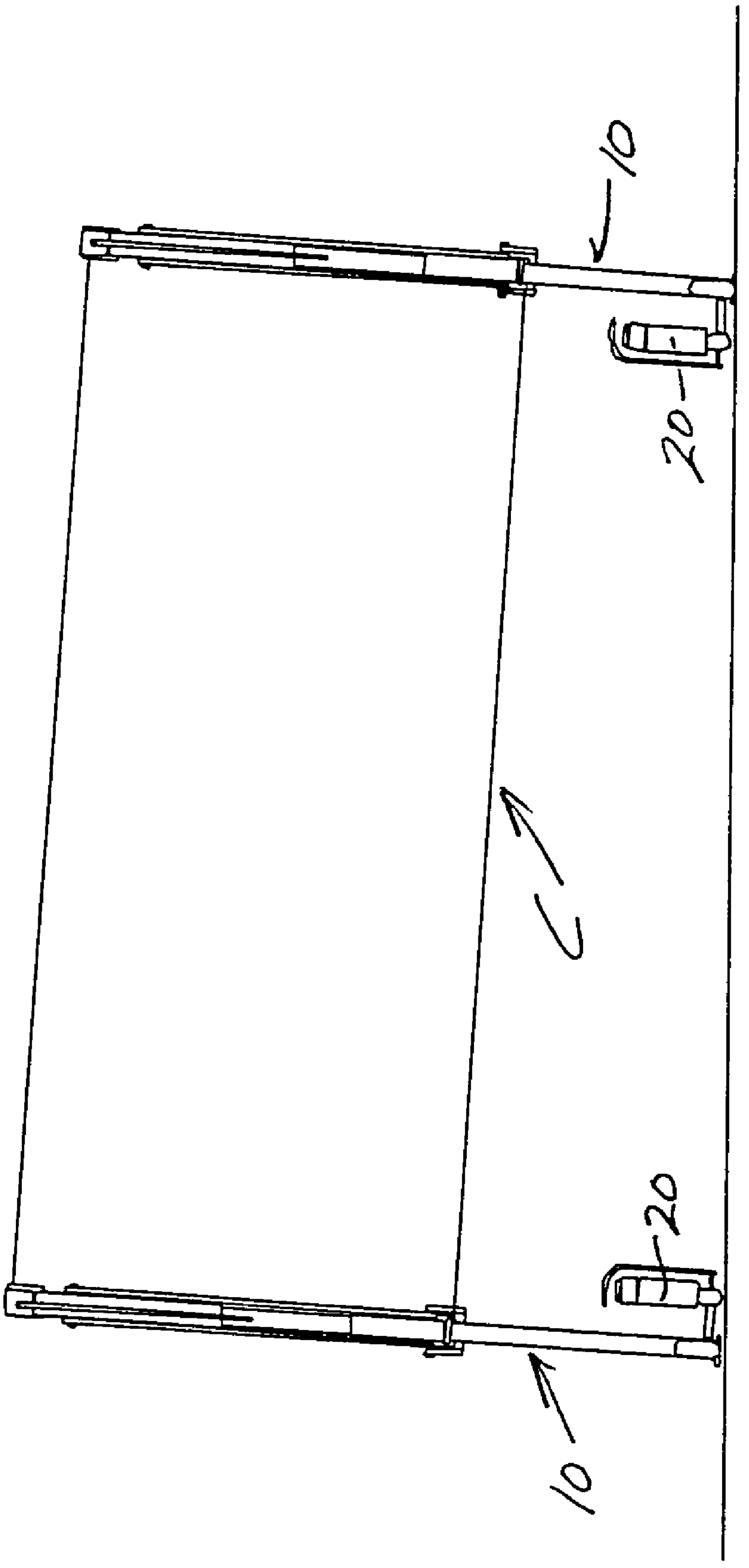
Figure 8:
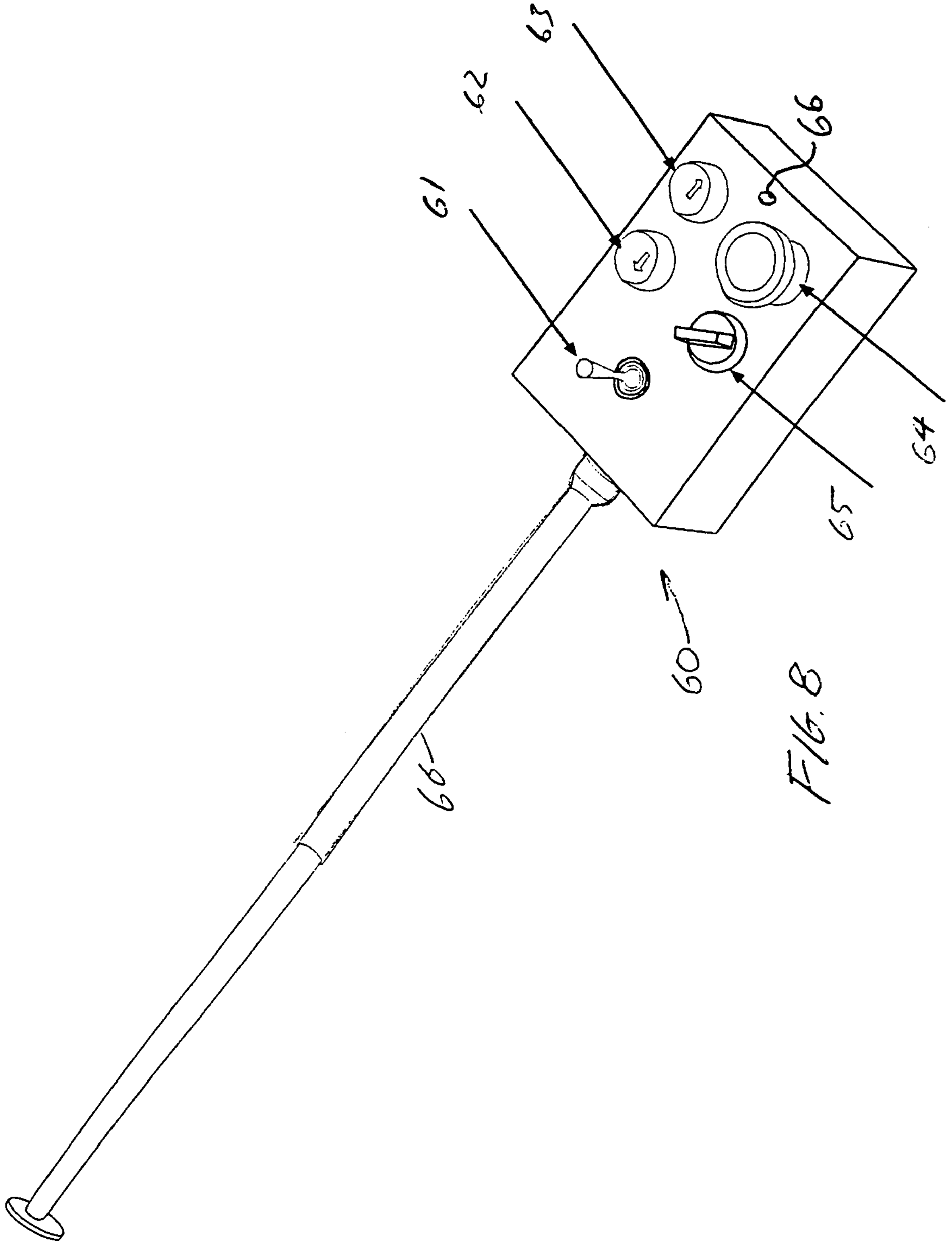

FIG. 6Ff is an illustrational view showing the container secured to the trailer of FIG. 6A with the jacks replaced in a storage position on the truck;

FIG. 7 is an illustrational view showing how the jacks of the invention may be independently operated to compensate for an unlevel surface; and FIG. 8 is a perspective view of a remote controller utilized to operate the motors of the jacks of the present invention.

DESCRIPTION OF THE PREFERRED EMBODIMENT

With continued reference to the drawing figures, the shipping container handling system or the present invention will be described with respect to the manner in which the invention is used to manipulate conventional shipping containers "C". Such containers are of predetermined size and configuration and generally are rectangular in cross section. To allow stable stacking and lifting by various loading and off-loading equipment, such conventional containers include corner lock castings "L" at each of the eight corners thereof. Such castings include three openings, one oriented toward the front or rear of the container, one toward the outside of the container and one toward the top or bottom of the container, depending upon the orientation of the casting. This allows the selective insertion of locking devices associated with equipment for manipulating the containers and also allows the containers to be locked to one another in stacked relationship.

By way of example only, such containers may vary in size from 8'×8'×8' to 8'×8'×10' or 8'×8'×20' or 8'×8'×30' or 8'×8'×40'. In addition, containers known in the industry as "High Cube" containers may be of sizes 8'×8' 9"× substantially any length in size.

The present invention utilizes four separate jacks 10 for manipulating a container to either load the container, off-load the container or transfer the container between vehicles, including trucks "T" having trailer beds "B", as illustrated in the drawing figures. Each jack 10 includes a vertical standard 12 which is formed of generally hollow steel and which is supported by a base plate 13 which steadies the jack relative to a support surface. Generally, the standard 12 will be of a height of which is generally equal to a height of the container "C" as illustrated in drawing FIG. 1.

With specific reference to FIGS. 1–4B, the jack standard 12 houses a power screw 14 which is connected at its lower end to a driven bevel gear 15. Bevel gear 15 is engaged by a connector beveled gear assembly 16 which is driven by an output drive gear 18 connect to a drive shaft 19 of an electric motor 20. The upper end of the power screw 14 is rotatably mounted within a bearing member 22 secured to a cap plate 23 of the standard 12.

Figure 4A:
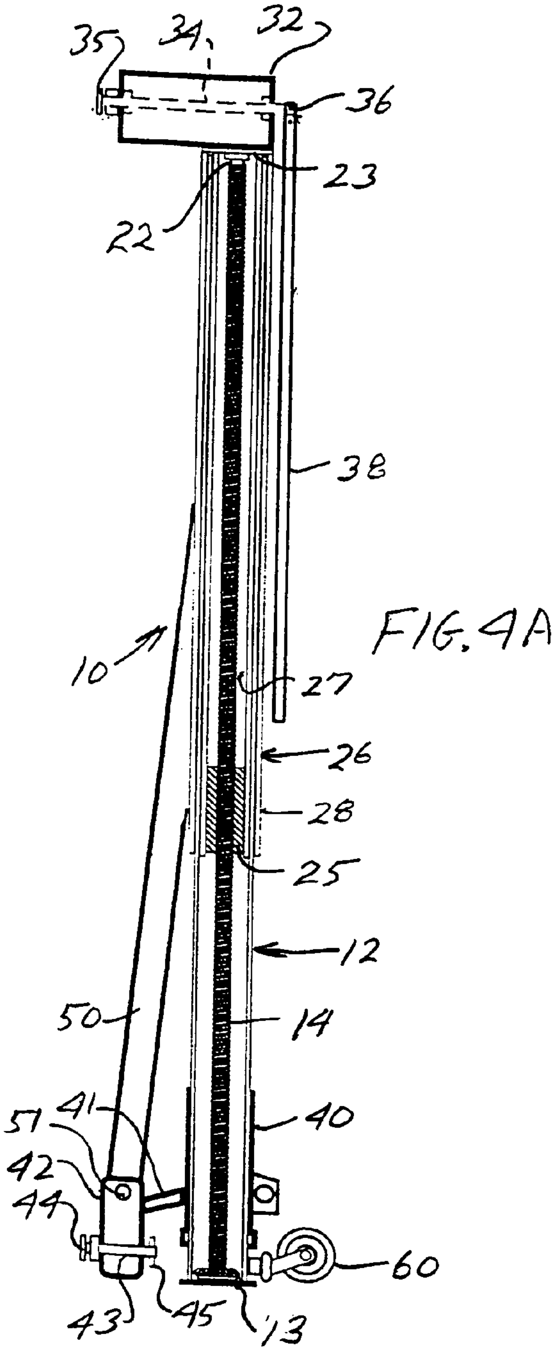
FIG. 4A is a cross sectional view through one of the jacks of the present invention.
Figure 4B:
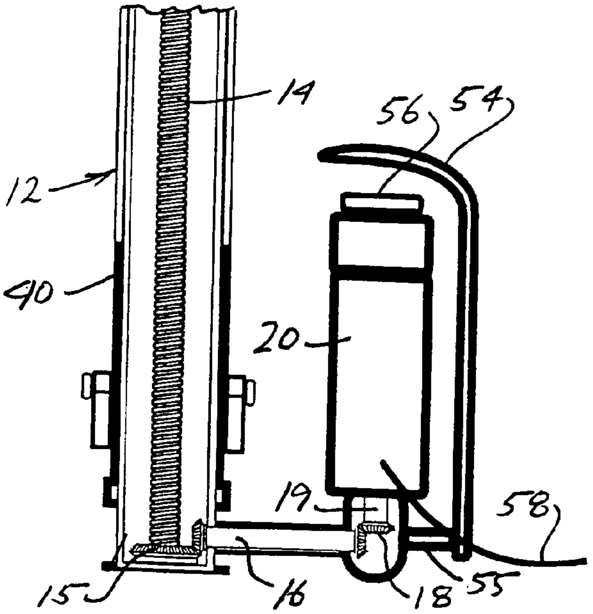
FIG. 4B is an enlarged cross sectional view of the drive connector between a motor and a power screw of the invention.

Mounted interiorally of the standard is an elongated traveling nut 25 which is fixedly secured to an inner wall of an upper guide sleeve 26 of the jack. In the preferred embodiments of the invention, as shown in FIG. 4A, the upper guide sleeve 26 includes concentrically spaced inner and outer portions 27 and 28 which are spaced on opposite sides of the standard 12 such that the upper guide sleeve slides along the standard with the standard being position between the inner and outer portions 27 and 28 of the upper guide sleeve 26. This reinforces the jack along the upper portion thereof. As the elongated traveling nut 25 is secured to the upper guide sleeve, depending upon the rotational direction of the power screw 14, the nut will move the upper guide sleeve either upwardly or downwardly relative to the jack standard 12.

Figure 3:
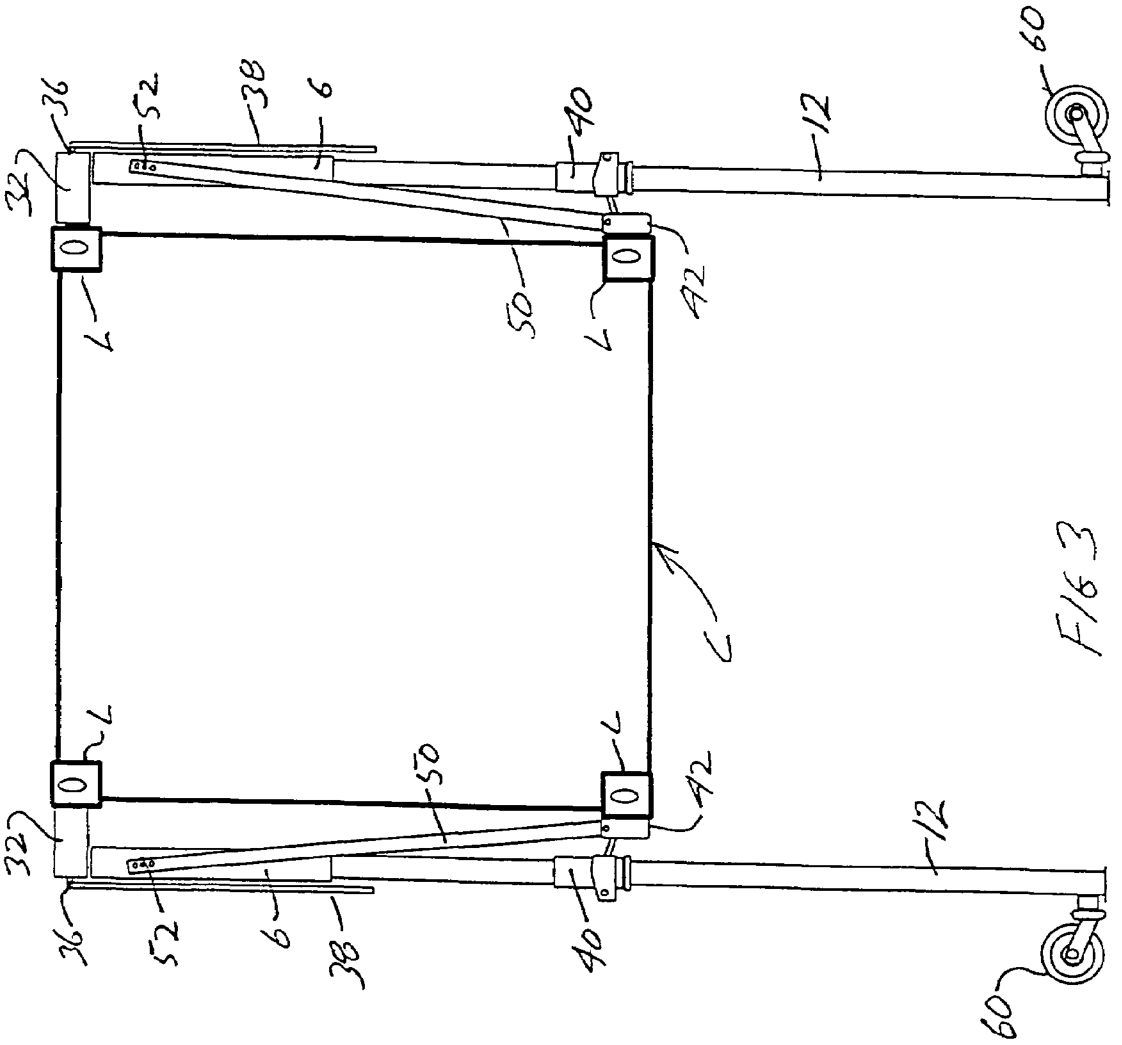
FIG. 3 is an illustrational view of the container of FIG. 1 being elevated by activation of the jacks of the present invention where the jacks are mounted at each of the eight corner castings of the container.

The upper guide sleeve 26 carries a housing 32 of an upper attachment member which is securely welded or otherwise secured to the cap plate 23 through which a twist lock 34 is rotatably received. The outer end of the lock includes a lock flange 35 and the opposite end is pivotally connected at 36 to an operating handle 38. As noted in the drawing figures, the handle 38 extends a substantial distance downwardly along the height of the standard of the jack such that it may be manually engaged at a distance from the lock 34 to allow remote movement of the lock, especially when the housing 32 is elevated, as is illustrated in FIG. 3 of the drawings.

The twist lock 34 is designed to be inserted within one of the openings of one of the corner lock castings "L" associated with the container after which it may be manipulated in such a manner that the flange 35 locks to the casting thus insuring that the attachment member cannot be disengaged without manual manipulation of the lock by operation of the handle 38.

The jack also includes a lower guide sleeve 40 which is configured to surround the jack standard 12 and is slideable with respect thereto. A strut 41 is securely mounted to the lower guide sleeve 40 and extends therefrom and mounts a housing 42 of a lower attachment member which carries a lower twist lock 43 having an outer locking flange 44 associated therewith. An operating handle 45 is provided for manipulating the twist lock 43 relative to housing 42. The flange 44 of the lock is designed to engaged within a lower corner casting of a container which is vertically aligned with respect to the corner casting in which the upper twist lock is engaged.

To stabilize the lower sleeve relative to the upper sleeve, a diagonally extending stabilizing bar or arm 50 is pivotally mounted 51 to the lower housing 42 and pivotally mounted at 52 to the upper guide sleeve spaced below the housing 32.

To facilitate manual handling of each of the jacks 10, an elongated handle 54 is shown as being secured by connector 55 to the motor housing. Also, a wheel assembly 60 is mounted to the base of the jack.

Each motor includes a motor control assembly 56 which is mounted thereto and which can be activated or controlled by a control device 60, as is shown in drawing FIG. 8. Each motor is also connected by a power cord 58 which has a connector (not shown) at its outer end of a type which is suitable to connect to an electrical source of power, such as batteries carried by a vehicle. The battery connection on the vehicle is shown at "V" in FIGS. 6A–6F.

With reference to FIG. 8, the remote controller 60 may be used by an operator to control lifting and lowering of the container "C". The controller includes a four way toggle switch 61. The toggle switch can be moved such that any one of four jacks 10 can be operated depending upon which corner of the container must be elevated or lowered due to an unlevel terrain on which the jacks are used.

A switch 62 is provided for elevating one or more of the jacks and a switch 63 for lowering one or more of the jacks. Switch 64 is an emergency stop and switch 65 is operable to select a particular jack to be operated or to allow all jacks to be operated simultaneously. The controller includes an extendable antenna 66 and is operable by an internal battery (not shown). A battery indicator 66 may also be provided so as to insure that the controller is charged.

Figure 1:
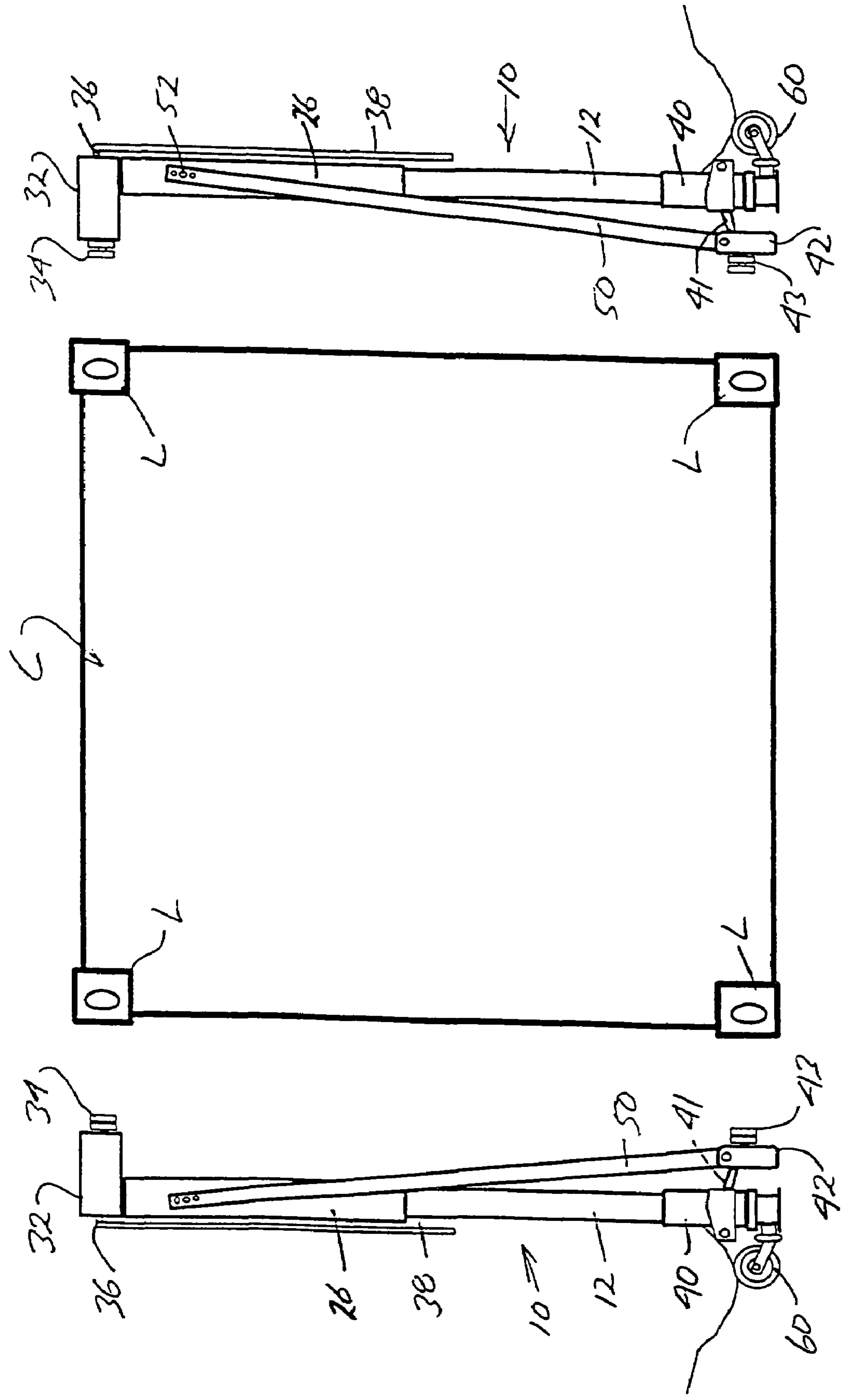
FIG. 1 is an illustrational view showing two of the jacks of the present invention positioned adjacent to the front and opposite corners of a conventional shipping container.

With specific reference to FIG. 1, a pair of jacks 10 are shown as being oriented at opposite corners of the containers "C". The standard 12 of each jack is shown as being vertically positioned such that the upper and lower attachment housings of each jack are aligned with the lock castings "L" of the container.

Figure 2:
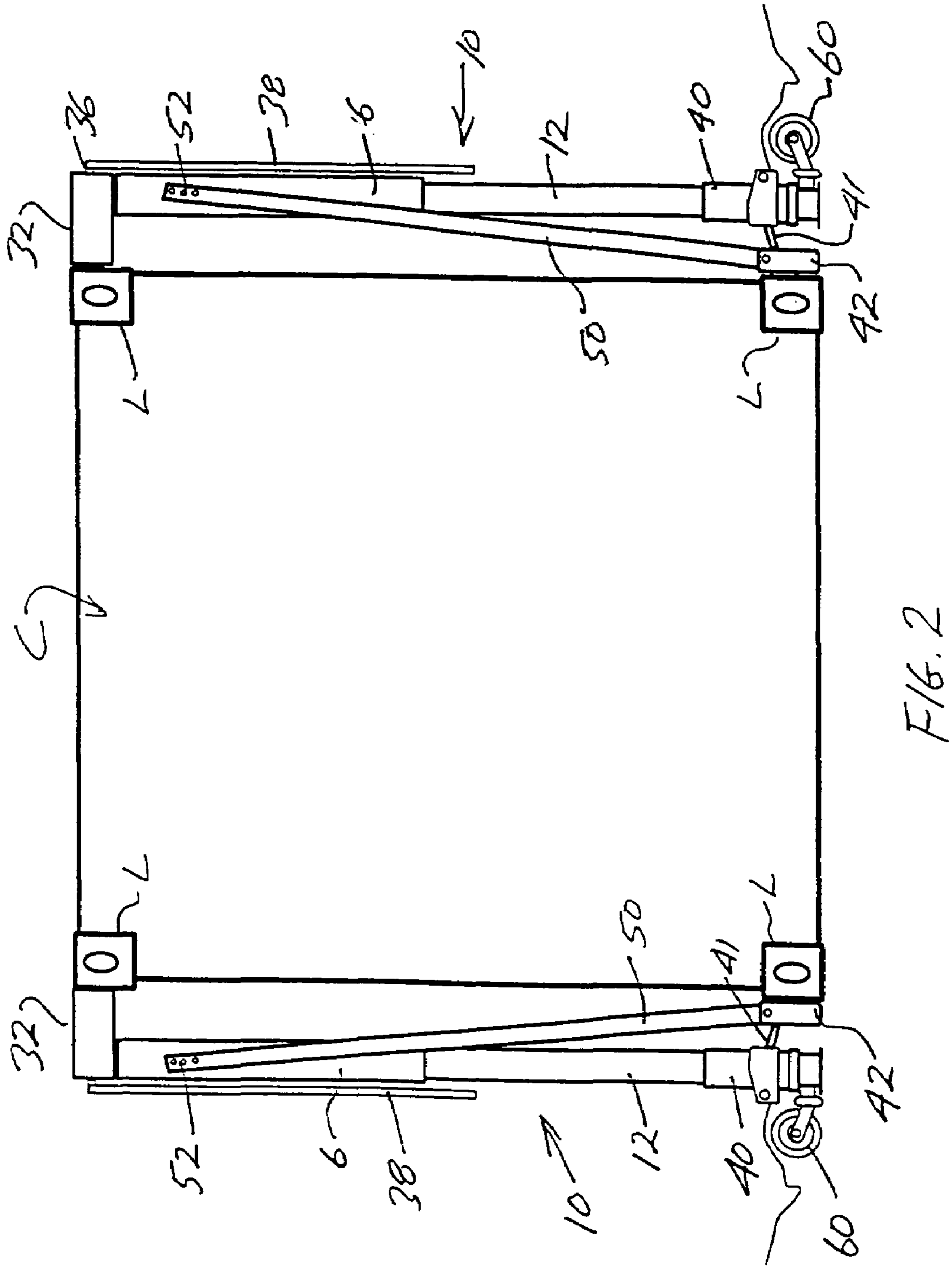
FIG. 2 is a view similar to FIG. 1 except showing the two jacks being connected to the corner lock castings at the front corners of the container.

In FIG. 2, the jacks have been moved into position and the twist lock flanges 34 and 43 associated therewith locked into the lock castings of the container. In FIG. 3, the jacks have been operated so as to raise both the upper and lower sleeves to elevate the container relative to the ground or other support surface.

Figure 5A:
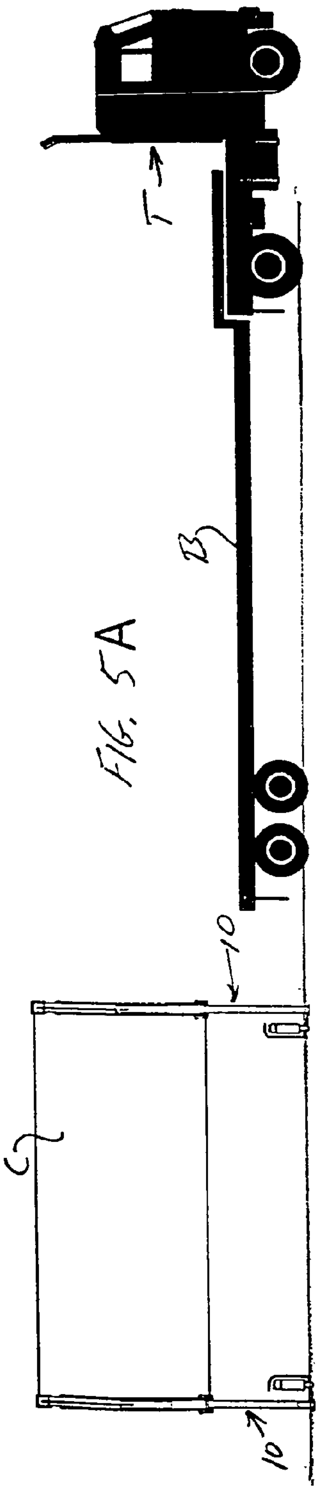
FIG. 5A is an illustrational view of the jacks of the present invention elevating a container relative to a trailer bed.
Figure 5B:
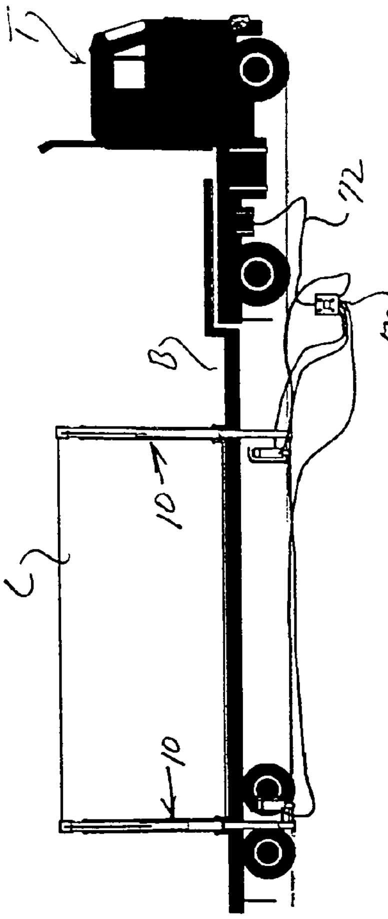
FIG. 5B is a view of the container of FIG. 5A being retained in position above the trailer bed.
Figure 5C:
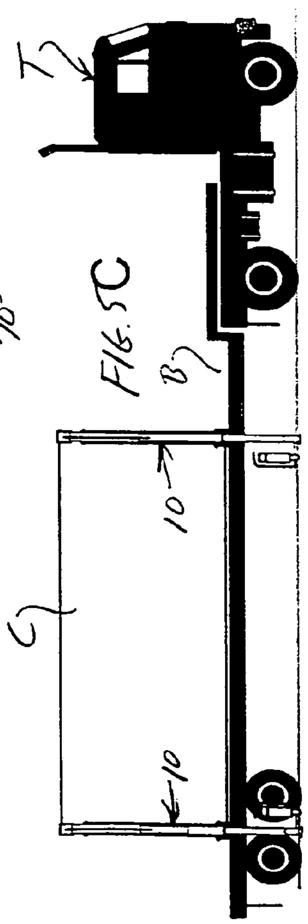
FIG. 5C is an illustrational view of the contain of FIG. 5A being lowered onto the bed of the trailer.
Figure 5D:
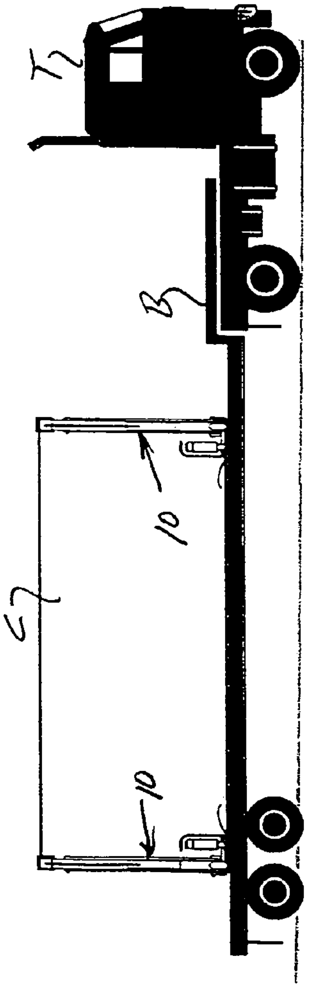
FIG. 5D is an illustrational view of the container of FIG. 5A showing the jacks being raised relative to the trailer after the container has been loaded on the trailer.
Figure 5E:
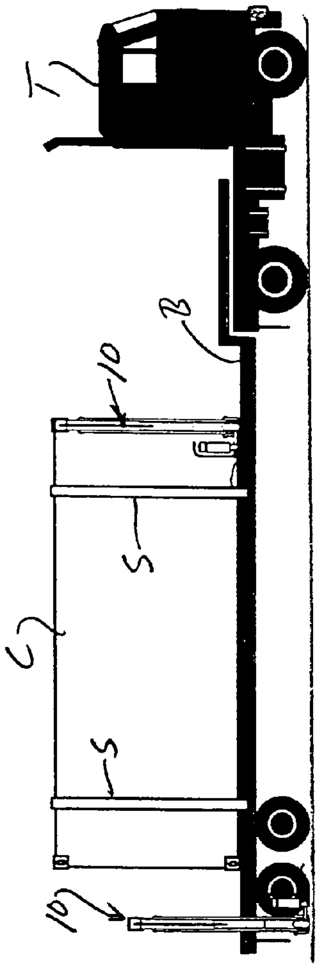
FIG. 5E is an illustrational view of the container of FIG. 5A showing the jacks removed from the container and showing the container strapped to the trailer.
Figure 5F:
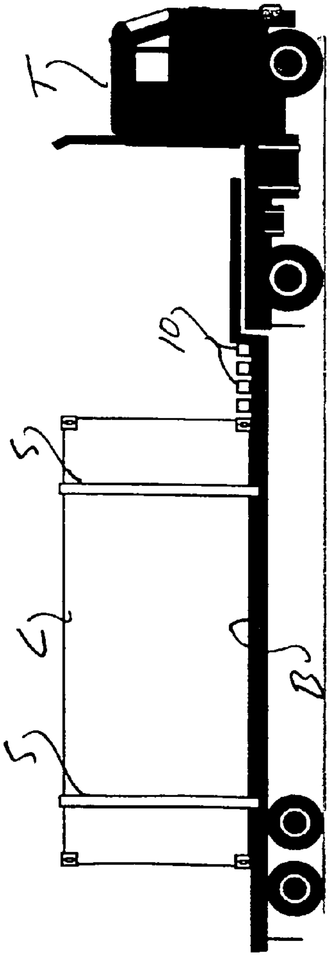
FIG. 5F is a view showing the jacks stored on the truck of FIG. 5A forwardly of the container.

For illustrational purposes, FIGS. 5A–5F show one manner in which a container may be loaded on a transport vehicle such as the truck "T" having a trailer bed "B". In FIG. 5A, with four of the jacks 10 mounted at the corners of the container, the jacks are elevated to raise the container above the truck bed. Thereafter, and as is illustrated in FIG. 5B, the trailer is backed beneath the container and intermediate the jacks 10. Thereafter, the jacks 10 are connected by way of their power cords 58 to a fixed controller 70 which will operate in the same manner as the remote controller 60. The controller 70 is connected by a line 72 to a power supply, such as an onboard battery "V" of the vehicle. With the truck positioned with the trailer bed "B" beneath the container "C", upon activation of the jacks 10 to lower the upper and lower guide sleeves, the container "C" is lowered to the trailer bed as shown and illustrated in FIG. 5C. Thereafter, the jacks are elevated so as to raise the standard of the jacks relative to the container to the position shown in FIG. 5D. At this point, the containers may be strapped, as shown at "S", to the trailer and the jacks 10 removed, as shown in FIG. 5E. The jacks are designed to be easily stored and carried such as illustrated in the forward portion of the trailer in FIG. 5F.

By way of further illustration of the operative characteristics of the present invention, and with specific reference to FIGS. 6A–6F, the manner in which a container is elevated from a support surface and thereafter loaded on vehicle is illustrated.

In FIG. 6A the container "C" is shown as being supported at ground level relative to truck "T" having trailer bed "B". As shown in FIG. 6A, one of the jacks 10 is shown as being mounted to the container "C" whereas another jack is shown as being mounted within a storage rack 80 provided on one side of the vehicle to rear of the vehicle cab. To facilitate the storage of the jacks 10, a double rack, such as shown at 80, may be provided on opposite sides of and immediately behind the truck cab, as illustrated FIG. 6B. The truck cab may further be included a folding ramp 85 which may be hinged at 86 so as to dropped to a lower position as shown FIG. 6B in order to allow rolling of the jacks 10 from the racks 80. In this respect, the jacks are supported by a pair of wheels or rollers, as previously described, to facilitate the movement of the jacks into and out of the racks 80 along the ramp 85.

In FIG. 6C, all of the jacks 10 have been mounted to the container "C" and the container is ready to be raised. The power cords from the motors associated with each of the jacks are connected to the source of power on the vehicle as shown in "V" and, thereafter, the controller, such as the remote controller described at 50, may be used to extend the upper guide sleeves 26 by driving the power screw 14 to elevate the upper guide sleeves. As the upper guide sleeve moves along the standards 12, the connector arms 50 will lift the lower guide sleeves 40 relative to the standards 12 until the container is raised to the position shown in FIG. 6D. Thereafter, the trailer is backed beneath the container "C" and the jacks 10 thereafter activated to lower the container "C" onto the bed of the vehicle. As illustrated in FIG. 6F, the container is shown as being strapped at "S" to the bed "B" of the vehicle and the jacks 10 stored in the racks 80 associated with the vehicle "T".

With specific reference to FIG. 7, there is an illustrational view showing a container being selectively elevated such that the jacks 10 are operated separately to compensate for sloping terrain in order to maintain the container "C" level as it raised or lowered, which is a feature of the present invention.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A jack for use in shipping container handling systems wherein the container includes corner lock castings at each corner thereof, the jack including; a vertical standard supported by a base, an upper guide sleeve slidingly mounted to said standard and movable with respect to an upper portion of said standard and a lower guide sleeve slidingly mounted to a lower portion of said standard so as to be retained in spaced relationship from said upper guide sleeve, connector means for connecting said upper guide sleeve to said lower guide sleeve, a drive means mounted within said standard and connected to a drive power source, said drive means being operable to move said upper guide sleeve relative to said standard and simultaneously move said lower guide sleeve relative to said standard by way of said connector means, first attachment means carried by said upper guide sleeve for selectively engaging an upper corner lock casting of a container and a second attachment means carried by said lower guide sleeve for selectively engaging a spaced lower corner lock casting of the container, and said connector means including an arm member having an upper end pivotally connected to said upper guide sleeve and a lower end pivotally connected to said second attachment means.

2. The jack of claim 1 in which said drive means includes an elongated power screw mounted within said standard and said drive power source including a drive motor, means for connecting an output of said drive motor to said power screw, a traveling nut mounted within said standard and to said power screw, and said traveling nut being secured to said upper guide sleeve.

3. The jack of claim 2 in which said upper guide sleeve includes concentric inner and outer portions positioned along inner and outer surfaces of said standard, respectively.

4. The jack of claim 3 in which said first attachment means includes an upper housing mounted to said upper guide sleeve and a first lock fastener extending through said upper housing, and an elongated handle that extends substantially mid way between said first and second attachment means pivotally connected to said first lock fastener.

5. The jack of claim 4 in which said second attachment means includes a lower housing mounted to said lower guide sleeve to which said lower end of said connector means is pivotally connected, and a lock fastener extending through said lower housing.

6. The jack of claim 2 including means for connecting said drive motor to a source of electrical power.

7. The jack of claim 1 further including a motor controller mounted to said drive motor, and a remote controller for operating said motor controller.

8. A shipping container handling system including four of the jacks as claimed in claim 1, and means for selectively operatively controlling each of said jacks independently or simultaneously relative to one another.

9. A shipping container handling system including a vehicle including a jack storage rack mounted thereto, said jack storage rack including means for supporting a plurality of jacks and a plurality of jacks as claimed in claim 1.

10. The system of claim 9 including means for selectively operatively controlling each of said plurality of jacks independently or simultaneously.

* * * * *